United States Patent [19]

Pirlet

[11] 4,322,627
[45] Mar. 30, 1982

[54] APPARATUS FOR MONITORING THE SURFACE OF THE CHARGE OF A SHAFT FURNACE

[75] Inventor: Robert A. Pirlet, Embourg, Belgium

[73] Assignee: Centre de recherches Metallurgiques-Centrum voor Research in de metallurgie, Brussels, Belgium

[21] Appl. No.: 100,977

[22] Filed: Dec. 6, 1979

[30] Foreign Application Priority Data

Dec. 6, 1978 [BE] Belgium .............................. 872578

[51] Int. Cl.³ .......................................... G01N 21/86
[52] U.S. Cl. .................................. 250/561; 250/236; 350/6.5
[58] Field of Search ................. 250/561, 236, 234; 350/6.5; 358/208

[56] References Cited

U.S. PATENT DOCUMENTS 4,122,525 10/1978 Eaton ................................. 250/561

Primary Examiner—David C. Nelms
Assistant Examiner—Darwin R. Hostetter
Attorney, Agent, or Firm—Holman & Stern

[57] ABSTRACT

A telemetric optical-radiation laser transmitter 5 outside an aperture 2 sends a beam to a point 14 scanned over the charge surface 1, via a rotating assembly 7 of deflectors, one deflector 11 oscillating with a periodicity related to the rotation of the assembly. A telemetric receiver 19, sensitive to the radiation from the transmitter 5 in a selected wavelength range, receives radiation re-transmitted from the point 14 through an aperture 3. A thermometric receiver 6 receives thermal radiation from the point 14 along a path coinciding with the path of the transmitted optical radiation.

15 Claims, 5 Drawing Figures

APPARATUS FOR MONITORING THE SURFACE OF THE CHARGE OF A SHAFT FURNACE

The present invention relates to apparatus for monitoring the surface of the charge of a shaft furnace, in particular a blast furnace, the monitoring being carried out by determining the levels and preferably also the temperatures at various points over all or part of the said surface.

The determination of the levels of the surface of the charge of a blast furnace is known and we have already advocated in particular the use of an optical telemeter comprising a transmitter and a receiver located at two different points above the surface to be monitored. The level of any point of this surface is calculated by means of a known triangulation formula using the point of transmission of the beam used, the point of impact on the said surface, and the point of reception of the beam. Such a measurement requires two apertures in the upper wall of the blast furnace and a considerable amount of equipment (large-size port, permanent cleaning means) in order to enable accurate work. In addition to the transmitter and receiver mentioned above, the telemetric equipment comprises suitable devices for scanning the surface to be monitored and for focusing and/or filtering the beam utilised.

Moreover, the determination of the temperatures of the surface of the charge of a blast furnace is also known and we have studied the application of thermometric receivers in the form of television cameras sensitive to infra-red rays. This measurement also requires an aperture in the upper wall of the blast furnace and the same considerable amount of equipment (large-size port, permanent cleaning means) in order to overcome the poor working conditions in the furnace throat.

In respect of the thermometric equipment, it should be noted that this comprises not only the receiver, but also equipment for scanning the surface to be monitored and for focusing and/or filtering the beams to be detected.

Metallurgists are attaching increasing importance to measurements of this type and to the possibility—in certain cases—of having such telemetric and thermometric data available simultaneously, whereas present practice is generally to carry these measurements out independently from one another.

In order to satisfy this requirement, it is obviously possible to provide the throat of the blast furnace with the three above-mentioned apertures (two for the telemetry and one for the thermometry) and to use the equipment normally required for each of these apertures. However, this solution has considerable drawbacks from the point of view of cost, space occupied, and excessive complexity. In effect, if these three apertures were provided, they would require considerable expenditure, as they have to be provided with very costly large-size ports and permanent cleaning devices. In addition, certain elements of the full equipment for telemetry and thermometry may have a double function.

The present invention provides apparatus for monitoring the surface of the charge of a shaft furnace, in particular a blast furnace, which comprises the following, disposed in front of at least one aperture of very small dimension situated in the portion of the furnace wall above this surface:

(a) a telemetric transmitter, generating optical radiation, preferably of the laser type, (b) at least one telemetric receiver sensitive to the radiation of the transmitter in a selected range of wavelengths, (c) means for scanning all or part of the surface, comprising:
   an assembly of deflectors, at least one of which is movable with respect to the others, enabling the transmission of the optical rays along a broken line between the surface of the charge within the furnace on one hand, the transmitter and the receiver being located, on the other hand, externally to the furnace, one portion of the said broken line being coincident or parallel to the optical axis of the transmitter and/or at least one detector,
   apparatus for rotating the deflector(s) which are movable about an axis perpendicular to the plane formed by the said broken line,
   apparatus for rotating the assembly of deflectors about an axis located in the plane formed by this broken line and coincident with or parallel to one portion of the broken line, (d) means for focusing and filtering the optical rays on the sensitive surface of the receiver or on a diaphragm inserted in the circuit formed by the said broken line.

It should be understood that the aperture(s) of small dimensions constructed in the furnace wall and through which the rays pass from the interior to the exterior of the furnace and vice versa preferably has (have) a diameter smaller than 15 mm; in these conditions, the above rays should cover a large angular field, preferably wider than 50°.

According to one embodiment of the invention, the telemetric transmitter and receiver constitute an optical telemeter of the radar type and the furnace wall above the surface of the charge comprises a single observation aperture.

According to a second embodiment of the invention, the device additionally comprises a thermometric receiver sensitive to the radiation of the charge in a selected range of wavelengths.

According to another embodiment of the invention, at least the deflector which is movable with respect to the others is common to both the telemetric and thermometric circuits.

According to a further embodiment of the invention, the telemetric receiver and the thermometric receiver are grouped in the vicinity of one of the two apertures constructed in the furnace wall, the telemetric transmitter being located in the vicinity of the other aperture.

According to a variant of the invention, the telemetric transmitter and the thermometric receiver are grouped in the vicinity of one of the two apertures constructed in the furnace wall, the telemetric receiver being located in the vicinity of the other aperture.

The telemetric receiver may be a closed circuit television camera, or may be constituted by photodiodes aligned in a two-dimensional network, or may be a rectilinear row of photodiodes or a PIN linear cell with a Schottky gate.

In accordance with the invention the deflectors may advantageously be mirrors.

Also in accordance with the invention, the mirrors are preferably plane and the centre of rotation of the movable mirror is preferably located outside the optical path.

According to a variant of the invention, the deflectors are of the opto-acoustic type.

In the case in which the telemetric and thermometric receivers are grouped in the vicinity of an aperture constructed in the furnace wall, these receivers are associated with a mirror which vibrates or rocks about a point of rotation or with a dichroic mirror, the said mirror being designed to separate the rays according to their destination.

In addition, the port portecting the optical system from the internal atmosphere of the furnace is rigid with the receiver support and the axis of rotation of the deflectors.

In accordance with the invention, the support to which the receiver and the axis of rotation of the deflectors is fixed, is preferably contained in a leak-tight casing.

The apparatus may be used as follows: the surface of the charge is scanned by means of the transmitter and the receiver(s), by way of the assembly of deflectors which are movable under their axis which is coincident with or parallel to one portion of the broken line, the orientation of the rays emitted and re-transmitted by the charge is measured, and the coordinates of the various points or places of the charge concerned are deduced from this; in a preferred variant of the method the temperature of the said points or places of the charge is also deduced.

According to the invention, the assembly of deflectors may be fixed about its axis of rotation in such a way that the axis of the transmitter is in the same plane as the axis of the telemetric receiver and the profile of the charge is plotted in this plane.

According to a variant of the invention, the assembly of deflectors is rotated permanently about its axis, the measurements are carried out when the axis of the transmitter and the telemetric receiver are located in the same plane, and the profile of the charge is deduced in this plane.

According to a particularly advantageous embodiment of the invention, the assembly of deflectors is rotated permanently about its axis in such a way that the surface of the charge is scanned by the receiver(s) and the said surface is also scanned by the transmitter, by way of a second assembly of deflectors, the measurements being carried out when the telemetric receiver is sensitized by the radiation re-transmitted by the charge.

According to a variant of the preceding embodiment, the assembly of deflectors is rotated permanently about its axis in such a way that the surface of the charge is scanned by the telemetric transmitter and possibly by the thermometric receiver and the said surface is also scanned by the telemetric receiver, by way of a second assembly of deflectors, the measurements being carried out when the telemetric receiver is sensitized by the radiation re-transmitted by the charge.

The invention will be described further, by way of example, with reference to the accompanying drawings, in which:

FIG. 1 diagrammatically shows the throat of a blast furnace provided with apparatus for monitoring the surface of the charge by way of two apertures provided in the portion of the furnace wall located above this surface;

FIG. 2 diagrammatically shows a variant of FIG. 1;

Figure 1:
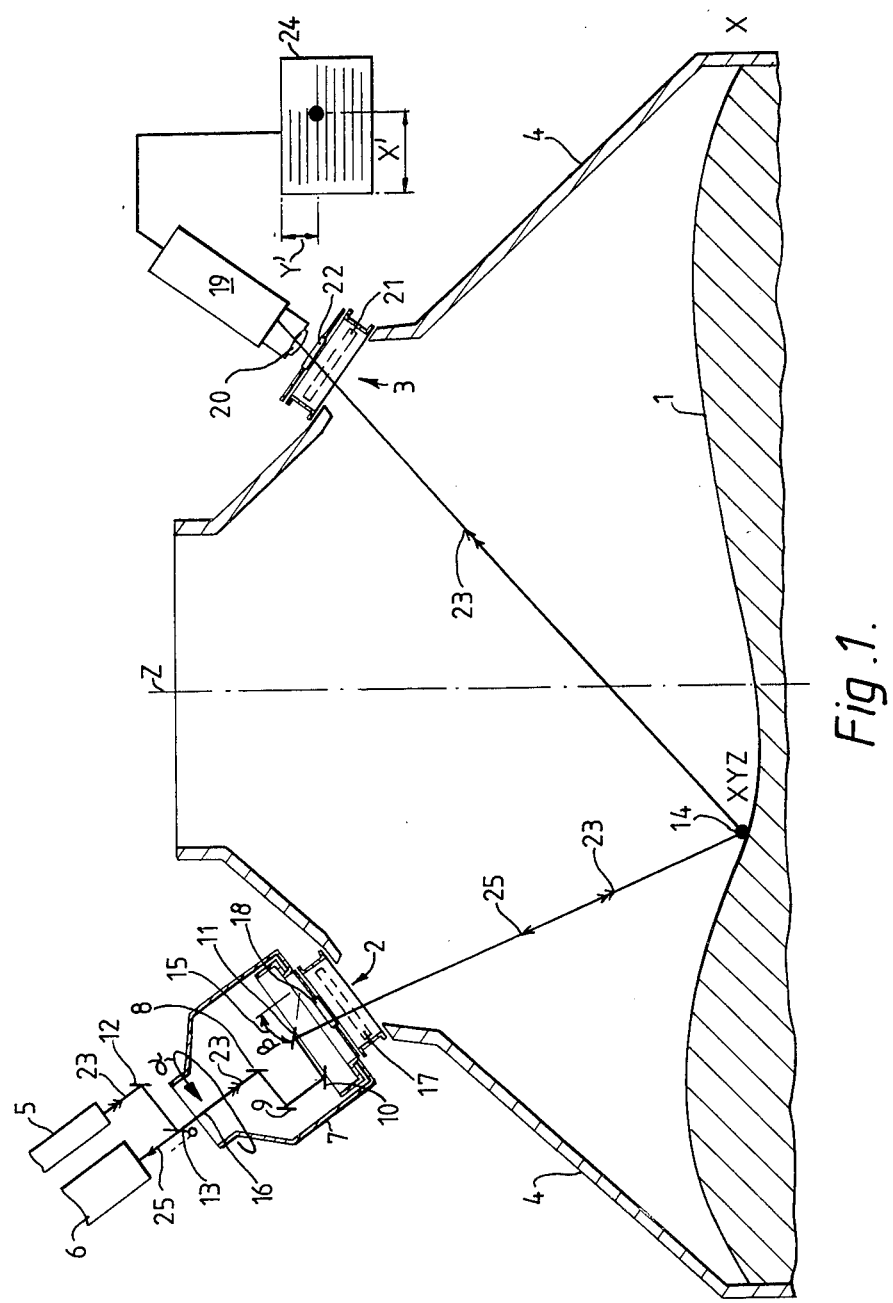

In FIG. 1, the surface 1 of the charge is monitored by way of two apertures 2 and 3 in the portion 4 of the furnace wall located above the surface 1.

Outside the aperture 2 there is a laser transmitter 5, a pyrometer 6, and a 4-mirror device 7 in order to scan all or part of the surface 1. The device 7 comprises an assembly of deflectors 8, 9, 10, 11 one of which (11) is movable with respect to the three others; this assembly, on one hand, enables transmission of telemetric rays, coming from the laser transmitter 5, along a folded optical path via the mirrors 12 and 13 to a point 14 on the surface 1 and, on the other hand, enables transmission of thermometric radiation from the point 14 to the pyrometer 6. The deflector 11 is movable, along the arrow 15, about an axis perpendicular to the plane defined by the optical axis 16 common to the laser 5 and the pyrometer 6 and by the optical path 8, 9, 10, 11. The device 7 is rotatable about the optical axis 16. The aperture 2 is provided with a gate 17 above which there is a window 18.

Outside the aperture 3 there is a television camera 19 (having an integral filter enabling the radiation from the laser 5 to pass), an objective lens 20, a gate 21, and a window 22.

Telemetric measurement is obtained in the following way. The laser transmitter 5 sends its rays along the path 12, 13, 16, 8, 9, 10, 11, 14, 19, shown by the double arrows 23, and the television camera 19 maintains on its sensitive surface the image 24 of the point 14 of the charge, and as the coordinates of this image are x' and y' those of the point 14 (x, y, z) may be calculated.

Thermometric measurement is obtained by the pyrometer 6 sensitised by the radiation from the point 14 passing along the path 14, 11, 10, 9, 8, 16, 6 indicated by the single arrows 25. It is to be noted that the mirror 13 is provided with a mechanism (not shown) which enables it to be dispensed with during the passage of the thermometric radiation along 8, 16, 6.

Figure 2:
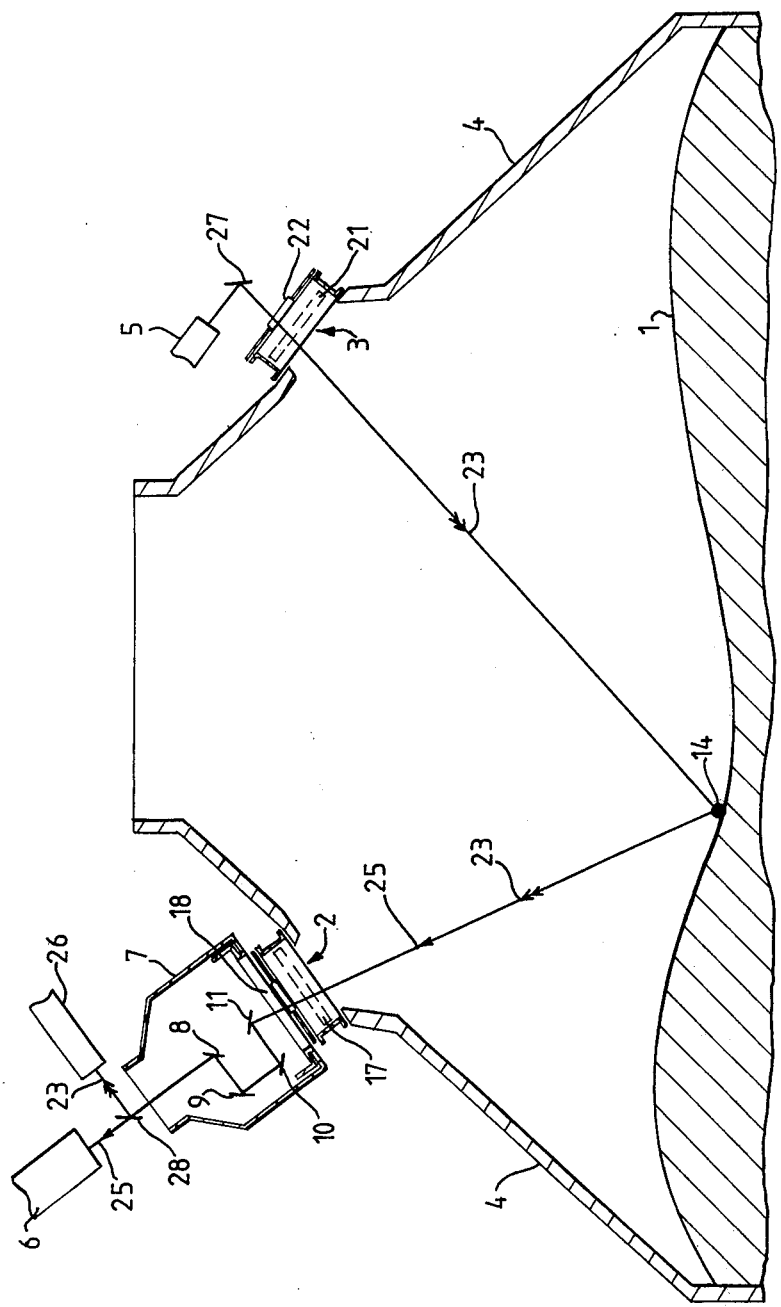

In the variant shown in FIG. 2 the aperture 2 is provided with a pyrometer 16 and a photoelectric cell or a photomultiplier 26, whereas the aperture 3 is provided with the laser transmitter 5. The same reference numerals are used to designate the same elements as in FIG. 1.

The telemetric radiation indicated by the double arrows 23 follows the path 5, 14, 11, 10, 9, 8, 26. For this purpose there is provided, on one hand, a mirror 27 designed to reflect and to direct, along a selected path to the charge, the radiation from the transmitter 5 in the direction of the point 14 on the surface 1 of the charge and, on the other hand, a mirror 28 designed to reflect radiation re-transmitted towards it by the point 14, in the direction of the cell 26.

The thermometric path indicated by the single arrows 25 is identical to that of FIG. 1.

Figure 3:
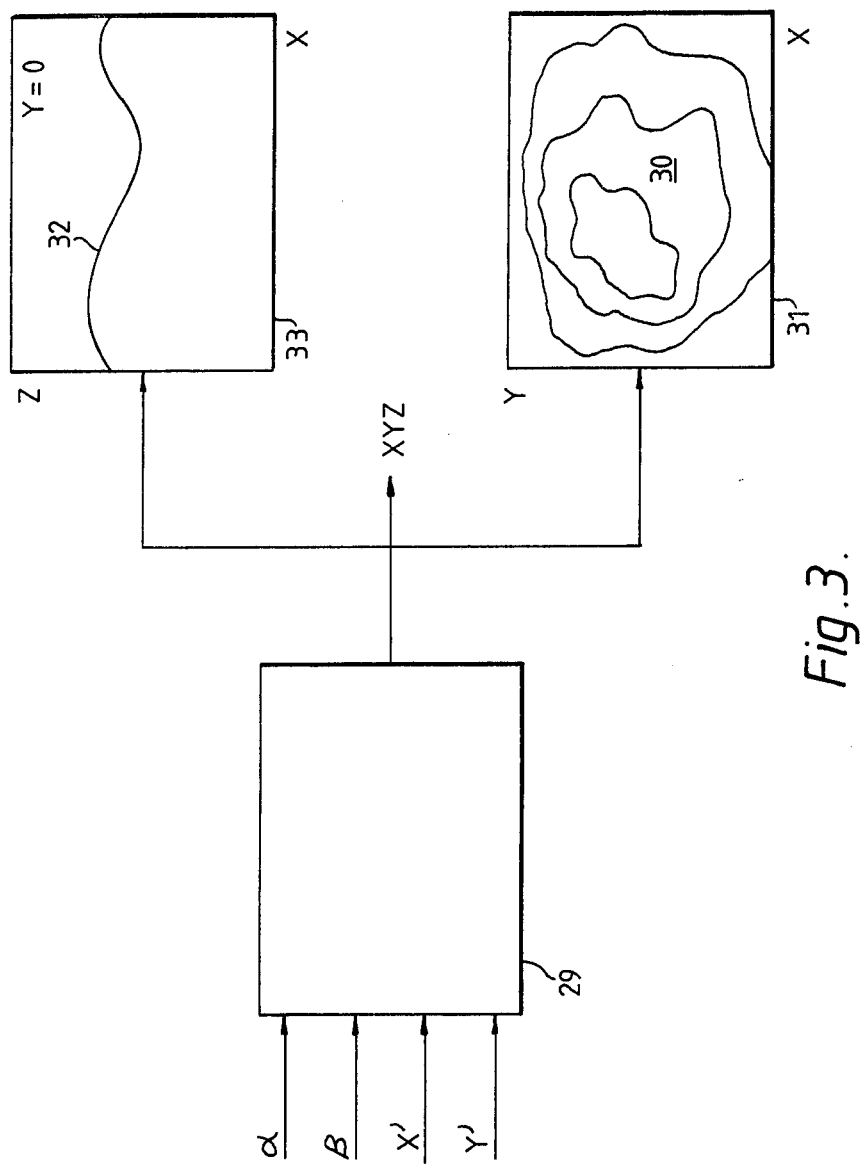
FIG. 3 is a block diagram illustrating the evaluation of measurements by means of a computer in order to obtain the required telemetric results.

The diagram of FIG. 3 shows that the following telemetric data are available: x' and y', which are the coordinates of the image of the point 14 recorded by the camera 19; α, which is the angle defining the position of the rotatable device 7; and β, which is the angle defining the position of the movable deflector 11. These data are fed into a computer 29 as they are obtained for the various points of the surface of the charge 1.

The computer 29 is programmed to provide (see FIG. 3) the actual coordinates x, y, z of each point of the surface 1 of the charge, in the form of level curves 30 in the diagram 31 having axes z, y, and profile curves 32 in the diagram or on the screen 33 having axes x, z (y=0).

Figure 4:
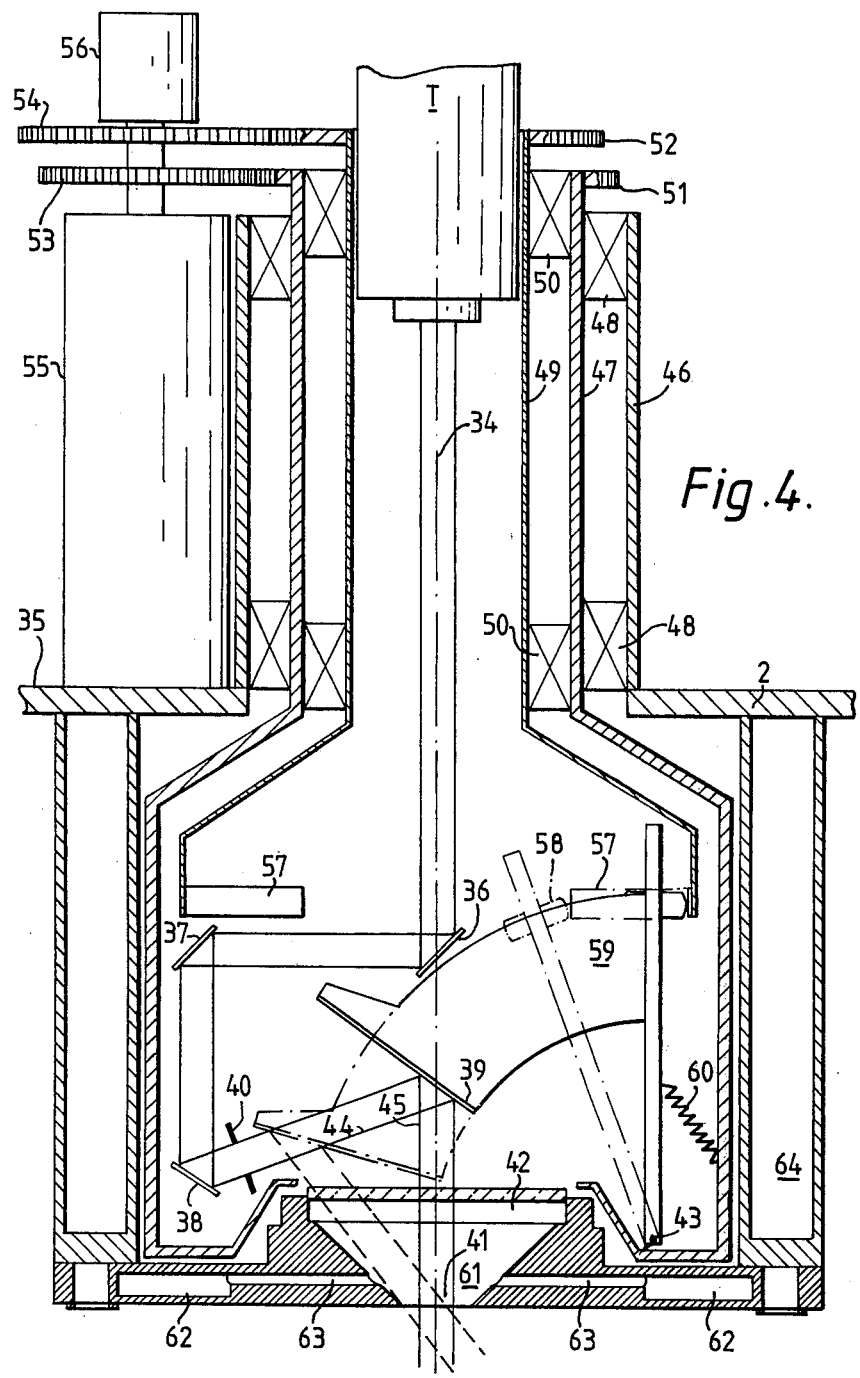
FIG. 4 shows a device for scanning the surface of the charge comprising a plane movable mirror, whose axis of rotation is located outside the path followed by the radiation from the aperture in the furnace wall to a detecting element.

In FIG. 4 the measuring component is a telemeter with a sight axis 34. This telemeter is disposed in a fixed manner on a support 35. The deflectors are constituted by plane mirrors 36, 37, 38, and 39. A diaphragm 40 provides a constant aperture for the optical system when in operation. The extension of the sight axis is deflected along a folded optical path by the mirrors 36 to 19 and passes through a small aperture 41 or observation orifice, before passing into the furnace in which the charge is to be monitored. This aperture 41 is located beyond a window 42.

The plane mirrors 36, 37, and 38 are fixed with respect to one another, and only the plane mirror 39 is movable such that it may rotate about an axis 43 perpendicular to a plane containing the sight axis 34 and the folded optical path. This axis 43 is located outside the path followed by the radiation from the aperture 41 to the telemeter T.

The two different positions of the intersections 44 and 45 common to the beam received and re-transmitted by the movable mirror 39 show that these intersections are subject to a combined movement of rotation and translation during displacement of the movable mirror 39.

According to the embodiment shown in FIG. 4, the movement of the mirror 39 is obtained as follows: a fixed tube 46 rigid with the support 35 is connected to a movable tube 47 by way of needle bearings 48. Inside the movable tube 47, a second movable tube 49 rotates with respect to the tube 47 and is maintained in place by two needle bearings with stops 50. The tubes 47 and 49 are caused to rotate by way of toothed crown gears 51 and 52, a differential constituted by toothed wheels 53 and 54 and a motor 55 respectively. The components 53, 54, and 55 are disposed rigidly on the support 35. A position indicator 56 is also provided. A cam 57 is located at the end of the tube 49, the movement of this cam displacing the axis of a follower 58 mounted in the rotating arm 59 rigid with the mirror 39. A recall spring 60 maintains the rotating arm 59 in contact with the cam 57. The profile of the cam 57 may be selected so as to cause scanning along a path of chosen form on the surface to be examined.

The assembly of mirrors 36, 37, 38, and 39 is rotatable about an axis which is coincident with the sight axis 34 and which is disposed rigidly on the support 35.

The system formed by the components 51, 52, 53, 54 constitutes a differential control of the tubes 47 and 49 in such a way that when the tube 47 for example carries out 10 rotations, the tube 49 carries out 11 in the same direction. Consequently during the 10 rotations of the tube 47, the mirror 39 carries out a complete forward and return movement.

Scanning of the surface to be observed within the furnace is carried out by two movements: on one hand, the movement provided by the rotation of the movable mirror 39 and, on the other hand, that provided by the rotation of the assembly of mirrors 36, 37, 38, and 39 about an axis which is coincident with the sight axis 34.

It should also be noted that it is advantageous to provide an air box 61 in front of the window 42 to act as a buffer between the window and the furnace interior. The air box 61 is supplied by a circular pipe 62 by way of ducts 63. The window 42 may be readily dismounted from its support, which is mounted on the air box 61, itself bolted to a cooling water jacket 64.

Figure 5:
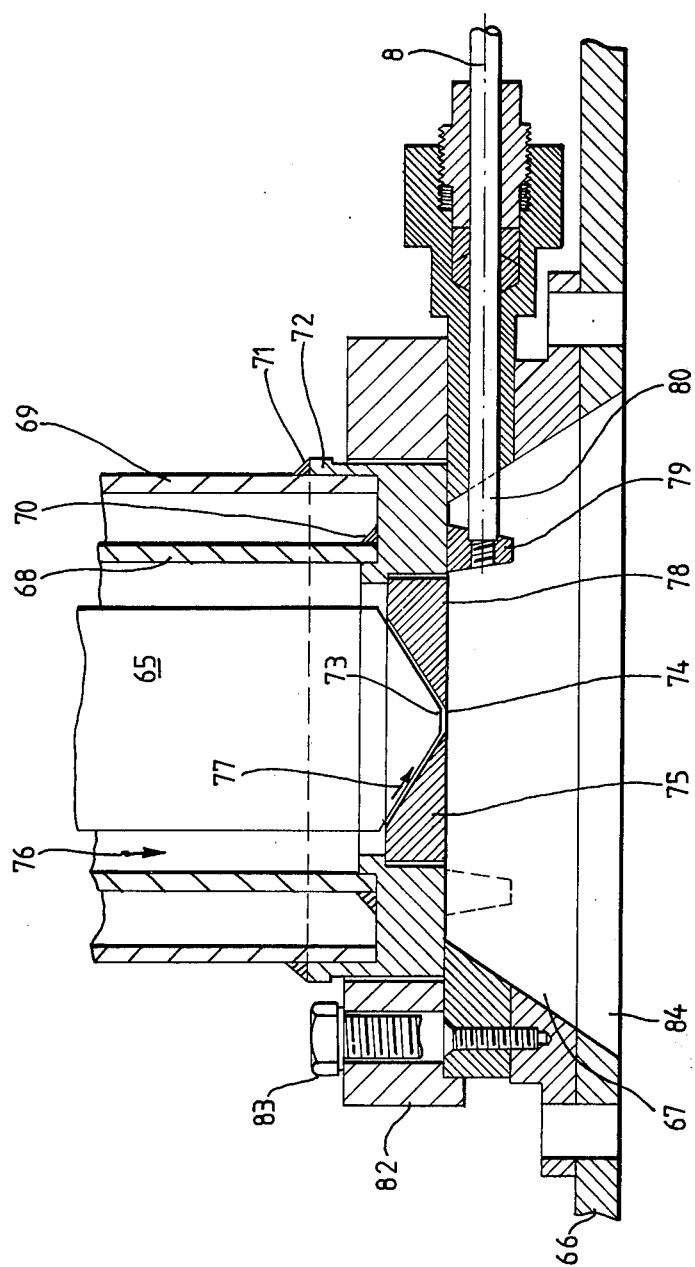
FIG. 5 shows a device enabling accurate observation of the surface of the charge of a blast furnace through an aperture which is not provided with a window.

According to FIG. 5, the end of the telemeter objective is shown at 65 and has a cylindrical form. A blast furnace wall 66 delimits the interior 67 of the furnace. The objective 65 is surrounded by two cylindrical jackets 68 and 69, the ends of which are welded on the outlet side at 70 and 71 on a ring plate 72. The end of the objective has a lens 73 located in front of a small aperture in a screen screwed rigidly to the plate 72. The lens 73 enables sighting at an angle of at least 40°, which is also enabled by the aperture 74. A supply device, not shown, enables dry de-oiled compressed air to pass between the objective 65 and the jacket 68 in the direction of the arrow 76, then in the direction of the arrow 77, in the narrow space provided between the objective and the surface of the screen facing the objective lens; this air is discharged through the aperture 74 and moves towards the interior of the furnace. The internal surfaces of the plate 72 and the screen 75 are in the same plane 78. A scraper 79 controlled by a rod 80 having a reciprocating movement along the axis 81 of the rod enables suitable cleaning of the screen 75 around the hole 74. The rod 80 may itself be operated by any means known per se. The device assembly is fixed to the wall 66, by a known system of flanges 82, bolts 83, etc. in a leak-tight manner, around a hole 84 provided in the wall 66.

We claim:

1. Apparatus for monitoring the surface of the charge of a shaft furnace, disposed outside at least one aperture in a furnace wall above the surface of the charge, the apparatus comprising:
   (a) a telemetric optical-radiation transmitter;
   (b) a telemetric receiver having a surface sensitive to the radiation of the transmitter in a selected range of wavelengths;
   (c) means for scanning at least part of the surface of the charge, comprising:
      (i) an assembly of deflectors, at least one of which is movable with respect to the others, enabling the transmission of optical rays along a folded optical path from the transmitter to the receiver via the surface of the charge, one portion of the optical path being coincident with or parallel to the optical axis of at least one of the transmitter and the receiver,
      (ii) means for rotating the movable deflector about an axis perpendicular to a plane containing the optical path, and
      (iii) means for rotating the assembly of deflectors about an axis located in the said plane coincident with or parallel to one portion of the optical path; and
   (d) means for filtering the optical radiation.

2. Apparatus as claimed in claim 1, in which the telemetric transmitter and receiver constitute an optical telemeter of the radar type and are associated with a single observation aperture.

3. Apparatus as claimed in claim 1, including a thermometric receiver sensitive to radiation from the charge in a selected range of wavelengths.

4. Apparatus as claimed in claim 3, in which the movable deflector is common to the telemetric and thermometric receivers.

5. Apparatus as claimed in claim 1, in which the telemetric receiver is associated with one of two apertures in the furnace wall, the telemetric transmitter being associated with the other aperture.

6. Apparatus as claimed in claim 3, in which the telemetric transmitter and the thermometric receiver are associated with one of two apertures in the furnace wall, the telemetric receiver being associated with the other aperture.

7. Apparatus as claimed in claim 1, in which the deflectors are plane mirrors and the movable mirror is rotatable about an axis located outside the optical path.

8. Apparatus as claimed in claim 3, in which, in the case in which the telemetric and thermometric receivers are grouped in the vicinity of one aperture in the furnace wall, these receivers are associated with a mirror which vibrates or rocks around a point of rotation, the said mirror being designed to separate the rays according to their destination.

9. A device as claimed in claim 3, in which, in the case in which the telemetric and thermometric receivers are grouped in the vicinity of an aperture in the furnace wall, these receivers are associated with a dichroic mirror, the said mirror being designed to separate the rays according to their destination.

10. A method of using apparatus according to claim 1, in which the surface of the charge is scanned by the transmitter and the receiver by way of the assembly of deflectors which are movable about its axis which is coincident with or parallel to a portion of the optical path, the orientation of the rays transmitted and re-transmitted by the load is measured, and the coordinates of various points on the charge surface are deduced from this.

11. A method as claimed in claim 10, in which the temperature of the points on the charge surface is also deduced.

12. A method as claimed in claim 11, in which the assembly of deflectors are fixed about its axis of rotation in such a way that the axis of the transmitter is in the same plane as the axis of the telemetric receiver, and the profile of the charge is plotted in this plane.

13. A method as claimed in claim 11, in which the assembly of deflectors is permanently rotated about its axis, the measurements are carried out when the axes of the telemetric transmitter and receiver are located in the same plane, and the profile of the charge in the same plane is deduced from this.

14. A method as claimed in claim 11, in which the assembly of deflectors is rotated permanently about its axis in such a way that the surface of the charge is scanned by the receiver, the said surface is also scanned by the transmitter by way of a second assembly of deflectors, and the measurements are made when the telemetric receiver is sensitized by the rays re-transmitted by the charge.

15. A method as claimed in claim 11, in which the assembly of deflectors is rotated permanently about its axis in such a way that the surface of the charge is scanned by the telemetric transmitter, the said surface is also scanned by the telemetric receiver by way of a second assembly of deflectors, and measurements are made when the telemetric receiver is sensitized by the radiation re-transmitted by the charge.

* * * * *